United States Patent
Chitrapu

(10) Patent No.: US 7,782,834 B2
(45) Date of Patent: *Aug. 24, 2010

(54) ROUTING HEADER BASED ROUTING IN INTERNET PROTOCOL (IP)-CELLULAR NETWORKS

(75) Inventor: Prabhakar R. Chitrapu, Blue Bell, PA (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/416,873

(22) Filed: May 3, 2006

(65) Prior Publication Data

US 2006/0199579 A1    Sep. 7, 2006

Related U.S. Application Data

(63) Continuation of application No. 10/328,662, filed on Dec. 23, 2002, now Pat. No. 7,043,247.

(60) Provisional application No. 60/393,358, filed on Jul. 1, 2002.

(51) Int. Cl.
H04J 3/24 (2006.01)
H04W 4/00 (2009.01)
H04L 12/28 (2006.01)

(52) U.S. Cl. .................. 370/349; 370/328; 370/392; 370/393; 370/401

(58) Field of Classification Search ................
370/395.52–395.53, 310, 328, 400–401,
370/465–467, 338, 349–350, 471, 351–356,
370/389–393, 35, 395.5, 395.54, 408, 476,
370/911, 913, 237–238, 277, 285, 474–475,
370/902; 455/414.1–414.4, 422.1, 433–434,
455/435.1, 445, 453, 550.1, 554.2, 556.1,
455/556.2, 557–558, 560–561, 425, 428,
455/448, 466, 418, 517, 552.1; 709/225,
709/227, 242, 238–239, 230, 229, 221, 218;
713/153, 160
See application file for complete search history.

(56) References Cited

U.S. PATENT DOCUMENTS 5,428,629 A * 6/1995 Gutman et al. ............... 714/758
5,720,032 A   2/1998 Picazo, Jr. et al.

(Continued)

FOREIGN PATENT DOCUMENTS

EP    1156626    11/2001

OTHER PUBLICATIONS

Jian Cai and David J. Goodman, *General Packett Service in GSM*, Oct. 1997, IEEE *Communications Magazine*, pp. 122-131.

(Continued)

*Primary Examiner*—Meless N Zewdu
(74) *Attorney, Agent, or Firm*—Volpe and Koenig, P.C.

(57) ABSTRACT

Internet protocol version 6 (IPv6) is substantially utilized throughout the entire cellular network and employs routing headers of the packets to ensure that the packets are routed via the gateway router (GR) to the end destination which is accomplished by a user equipment (UE) specifying the IP address of the gateway router as the IP address of an intermediate router in the routing header. Packets may also be routed to UEs from the GR through an intermediate router.

18 Claims, 3 Drawing Sheets

U.S. PATENT DOCUMENTS

| | | | |
|---|---|---|---|
| 5,881,145 A * | 3/1999 | Giuhat et al. | 379/207 |
| 6,091,706 A | 7/2000 | Shaffer et al. | |
| 6,118,784 A | 9/2000 | Tsuchiya et al. | |
| 6,172,986 B1 | 1/2001 | Watanuki et al. | |
| 6,178,235 B1 | 1/2001 | Peterson et al. | |
| 6,195,706 B1 | 2/2001 | Scott | |
| 6,522,655 B1 * | 2/2003 | Laiho | 370/410 |
| 6,580,717 B1 * | 6/2003 | Higuchi et al. | 370/401 |
| 6,587,438 B1 | 7/2003 | Brendel | |
| 6,591,306 B1 | 7/2003 | Redlich | |
| 6,614,765 B1 | 9/2003 | Bruno et al. | |
| 6,654,589 B1 * | 11/2003 | Haumont | 455/67.11 |
| 6,721,297 B2 | 4/2004 | Korus et al. | |
| 6,795,917 B1 * | 9/2004 | Ylonen | 713/160 |
| 6,845,091 B2 * | 1/2005 | Ogier et al. | 370/338 |
| 6,862,274 B1 | 3/2005 | Tsao et al. | |
| 6,907,017 B2 * | 6/2005 | Reddy et al. | 370/331 |
| 7,012,931 B2 * | 3/2006 | Higuchi et al. | 370/467 |
| 7,016,352 B1 * | 3/2006 | Chow et al. | 370/392 |
| 7,043,247 B2 * | 5/2006 | Chitrapu | 455/445 |
| 7,116,681 B1 * | 10/2006 | Hovell et al. | 370/466 |
| 7,120,131 B2 * | 10/2006 | Seppala et al. | 370/310 |
| 7,200,116 B2 * | 4/2007 | Kobayashi | 370/237 |
| 2001/0044305 A1 * | 11/2001 | Reddy et al. | 455/436 |
| 2001/0048686 A1 * | 12/2001 | Takeda et al. | 370/401 |
| 2002/0012320 A1 | 1/2002 | Ogier et al. | |
| 2002/0099856 A1 | 7/2002 | Shitama | |
| 2002/0196781 A1 | 12/2002 | Salovuori | |
| 2002/0196793 A1 * | 12/2002 | Samba et al. | 370/401 |
| 2003/0005089 A1 | 1/2003 | Kumar | |
| 2003/0016655 A1 | 1/2003 | Gwon | |
| 2003/0074570 A1 | 4/2003 | Miyoshi | |
| 2003/0081578 A1 | 5/2003 | White et al. | |
| 2003/0081592 A1 | 5/2003 | Krishnarajah et al. | |
| 2003/0156584 A1 | 8/2003 | Bergenlid et al. | |
| 2003/0227911 A1 | 12/2003 | Trossen | |

OTHER PUBLICATIONS $3^{rd}$ *Generation Partnership Project: Technical Specification Group Services and System Aspects; General Packet Radio Service (GPRS); Service description Stage 2 (Release 6)*; 2003, 3GPP Organizational Partners, GSM Global System For Mobile Communicaitons.

Loukola, M.V. and Skytta J.O., "New Possibilities Offered by IPv6," 1998 IEEE; Department of Electrical and communications Engineering, Helsinki University of Technology, P.O. Box 3000, 02015 HUT Finland.

Carpenter, Brian et al., *Connecting IPv6 Routing Domains Over the IPv4 Internet*, Mar. 2000, *The Internet Protocol Journal*, pp. 2-10.

* cited by examiner

ROUTING HEADER BASED ROUTING IN INTERNET PROTOCOL (IP)-CELLULAR NETWORKS

CROSS REFERENCE TO RELATED APPLICATIONS

This application claims priority from U.S. provisional application No. 60/393,358 filed on Jul. 1, 2002, and application Ser. No. 10/328,662 filed on Dec. 23, 2002 now U.S. Pat. No. 7,043,247 which are incorporated by reference as if fully set forth.

BACKGROUND

This invention relates to cellular networks. More particularly, the invention relates to a technique employing routing headers in internet protocol (IP) packets to route packets to an end destination through intermediate routers employing routing headers.

FIG. 1 shows a typical cellular network such as a Global System for Mobile Communications/Generalized Packet Switched Service (GSM/GPRS) network. In IP-applications there is a single point of attachment to the external IP-networks such as the Public Internet, the single point of attachment being a gateway general packet radio service support node (GGSN) also referred to in FIG. 1 as the gateway router GR. The Gateway Router is connected to the Public Internet and also to X.25 Networks via Firewalls F2 and F1, respectively. On the radio network side, the Gateway Router is coupled to the intra-public land mobile network (Intra-PLMN) internet protocol (IP) backbone for sending two-way data from multiple user equipments (UEs). The IP-layer in the user equipment (UE) terminates at the GGSN which, in turn, means that there is a single "IP-level-hop" from the UE to the GGSN. FIG. 2 shows the protocol stacks used for exchanging IP data between the user equipment, also referred to as the mobile station (MS), base station sub-system (BS), the serving GPRS support node (SGSN) and the gateway GPRS support node (GGSN).

Typically, the UMTS network is made up of switching elements which transfer the IP-packets through the employment of Layer-2 switching techniques. Some UMTS networks utilize IP-based routing elements. However, the IP-technology is used purely for transport purposes only and is not visible to the UE, meaning that the IP-layer of the UE is still terminated at the GGSN.

It is a clear possibility that future cellular networks will be entirely IP-based. In other words, the cellular network will be an interconnected network of IP-routers with the result that the IP-layer of the UE may be terminated by a nearby router. However, since the network is still assumed to have a single point of attachment to the external IP-networks, IP packets from the nearest router must be routed to the gateway router GR (for example, the GGSN shown in FIG. 1). In the prior art, this is achieved by establishing IP-tunnels which involve IP-in-IP encapsulation. This approach has the disadvantages of requiring the need to set up tunnels and the extra overhead due to encapsulation.

Another scenario is a network of a number of LAN Access Routers (ARs), wherein each Access Router is connected to a number of Access Points, as shown in FIG. 3. A single gateway router serves these ARs and provides connectivity to the external IP-networks. Such a network may also be referred to as an Autonomous System or an IP-domain. Other scenarios include universal mobile telecommunications system (UMTS) networks, code division multiple access CDMA2000 networks etc.

SUMMARY

The present invention utilizes internet protocol version 6 (IPv6) throughout the entire cellular network and employs routing headers of the IPv6 packets to ensure that the packets are routed via the gateway router to the end destination which is accomplished by specifying the IP address of the gateway router as the IP address of an intermediate router in the routing header.

BRIEF DESCRIPTION OF THE DRAWING(S)

The present invention will be understood from a consideration of the figures in which like elements are designated by like numerals and, wherein.

DETAILED DESCRIPTION OF THE PREFERRED EMBODIMENT(S)

The present invention eliminates the disadvantages of the prior art through the utilization of internet protocol version 6 (IPv6) throughout the entire Cellular Network and using Routing Headers of IPv6 packets to ensure that the packets are routed via the gateway router to the end destination. This is accomplished through the present invention by specifying the IP-address of the gateway router as an IP-address of an intermediate router in the routing header.

Figure 1:
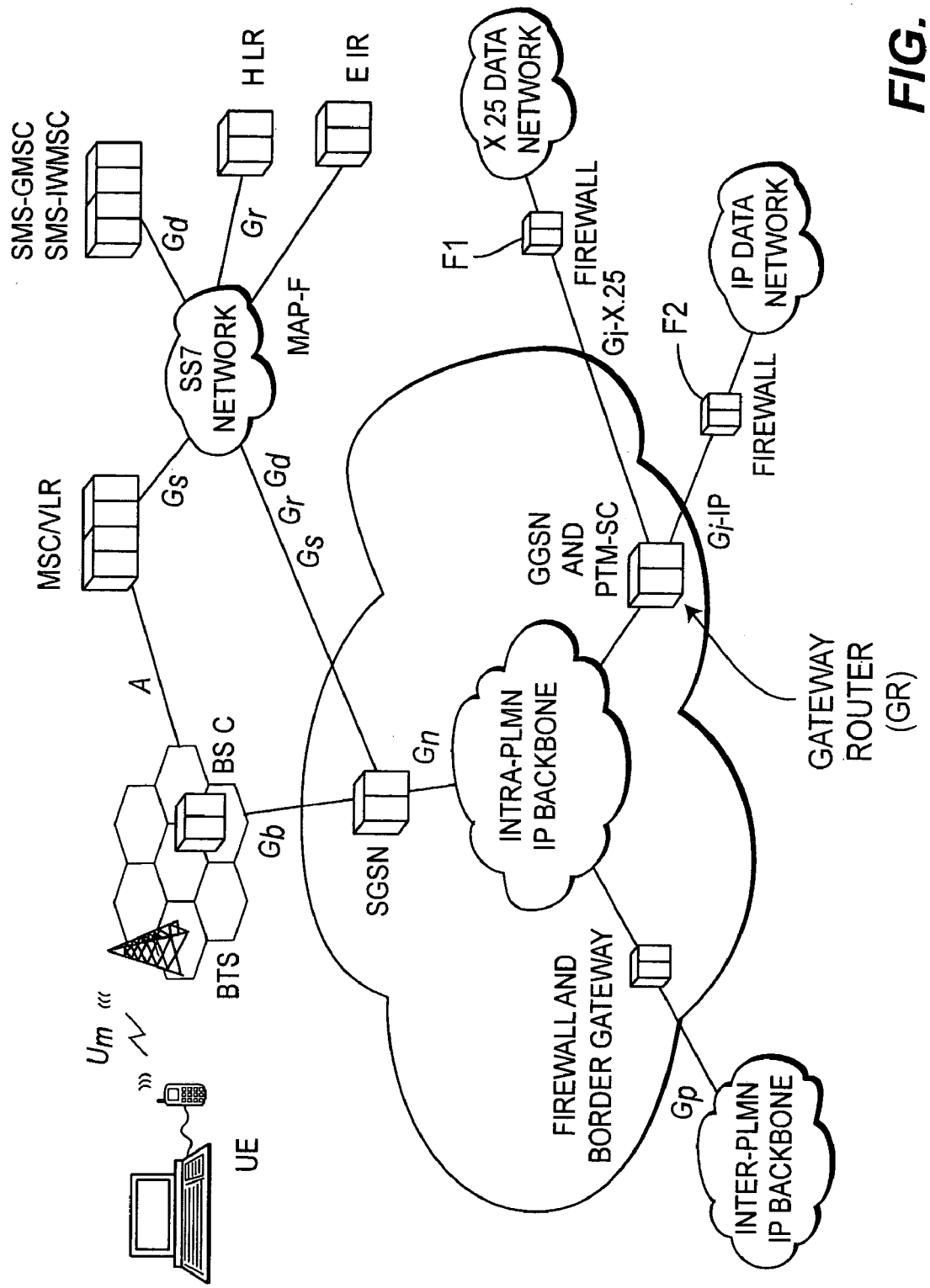
FIG. 1 shows a typical global system for mobile communications/general packet radio service (GSM/GPRS) cellular network.
Figure 2:
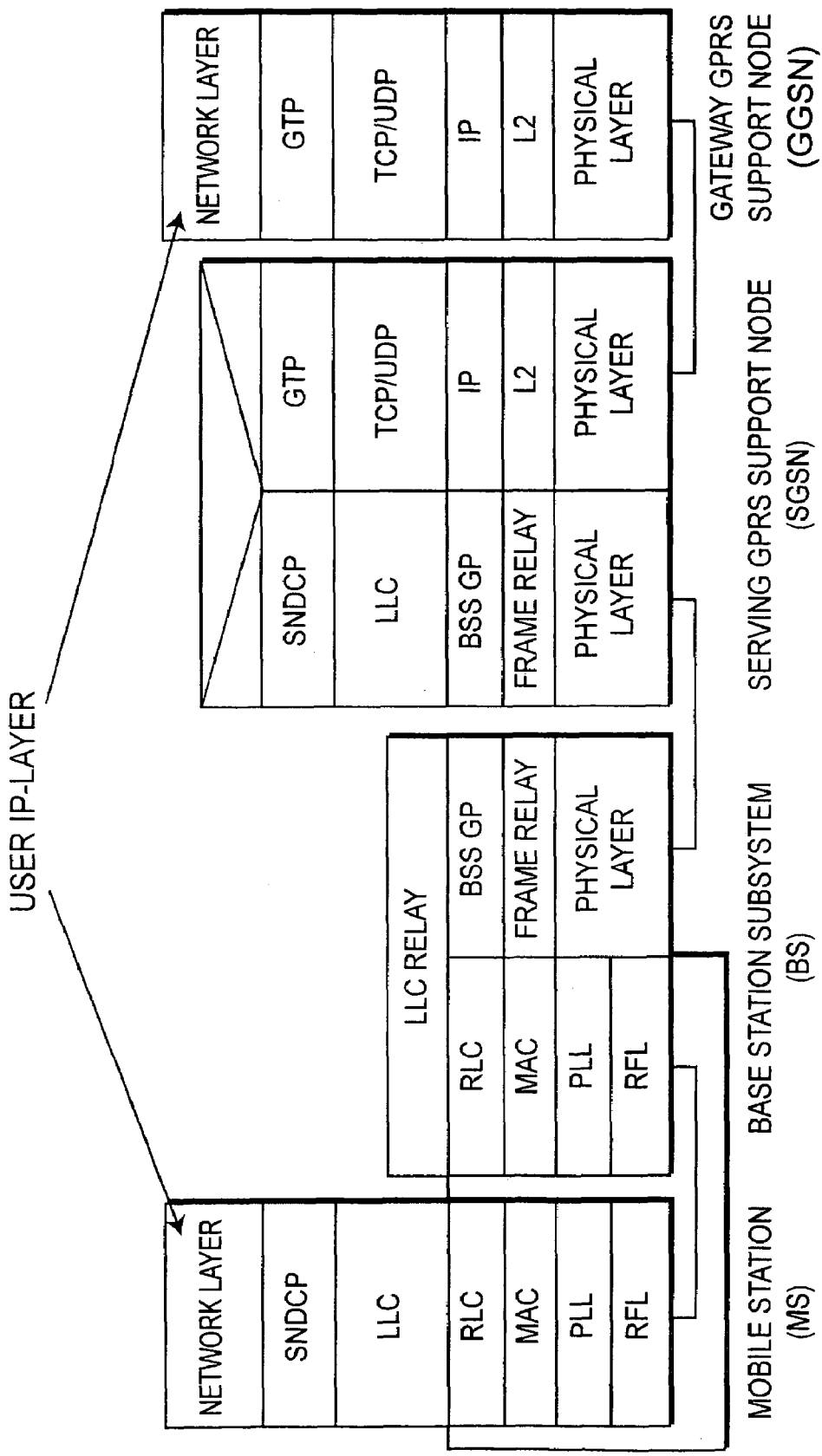
FIG. 2 shows the layers making up the mobile station, base station, SGSN and GGSN of FIG. 1.
Figure 3:
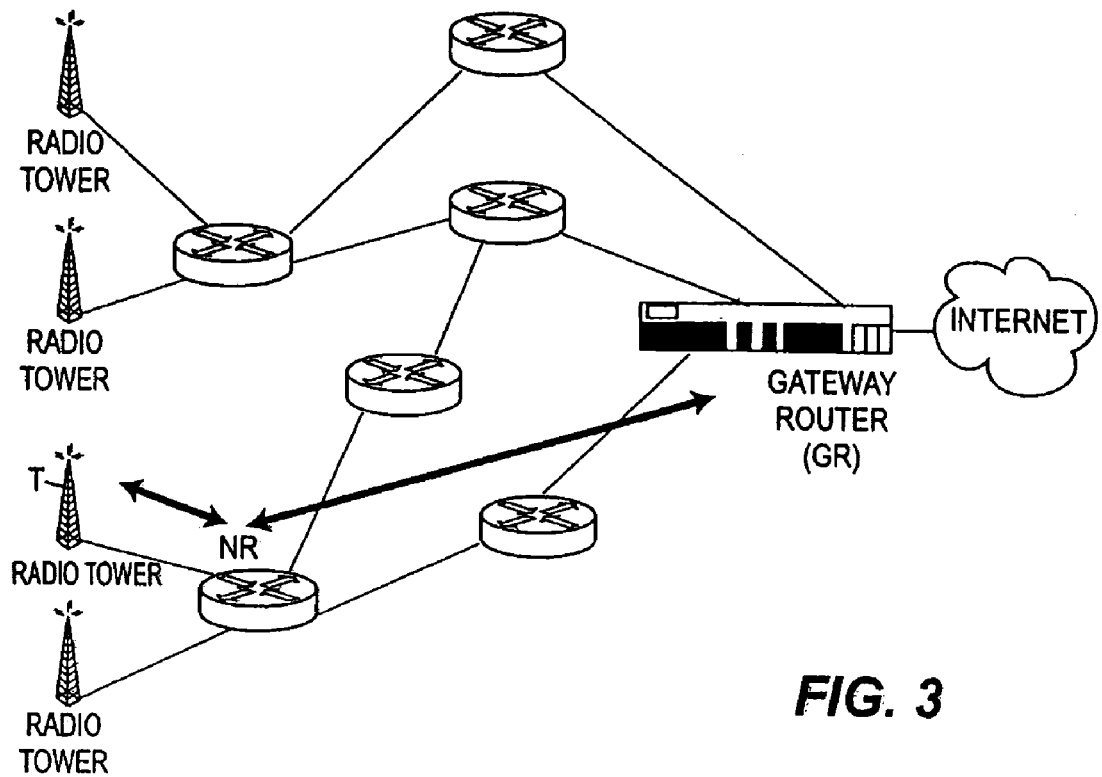
FIG. 3 shows a network employing WLAN Access Routers connected to a number of Access Points.

As shown in FIG. 3, user IP packets are sent from the UE (see also FIG. 1) to the nearest router NR shown, by way of the radio tower T (see FIGS. 1 and 3) and then to the gateway router GR. The IPv6 header of the User IP packets contain the IP addresses of the Gateway Router GR in the Routing Header. At a minimum, the Gateway Router is a simple IP Router that can route IP packets based on their destination IP address. However, the Gateway Router may have additional features, such as Source Address based Routing, Network Address Translation, QoS based Routing (such as DiffServ, MPLS etc), Secure Firewalls, etc. In addition, the gateway router has the capability of sending messages to the UE as to the addresses of those routers which may be included in a routing header in order to select a router or routers having smaller or no traffic loads.

Figure 4:
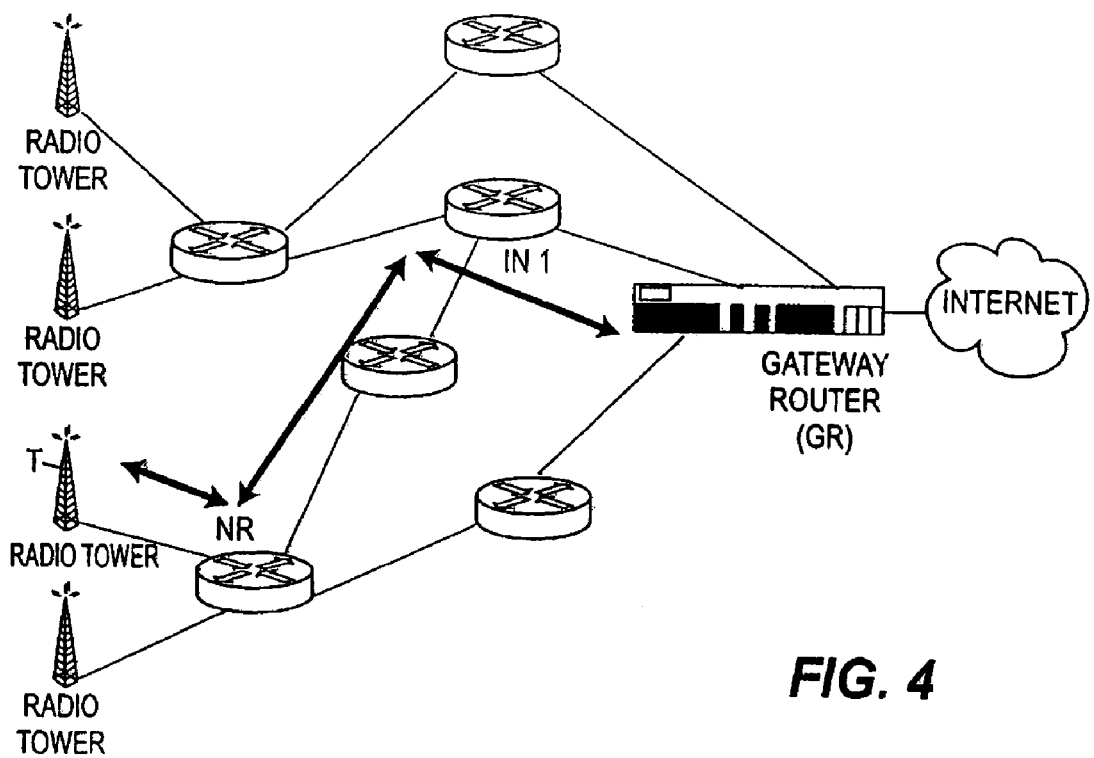
FIG. 4 shows a network similar to the network of FIG. 3 and further describing the manner in which routers are used as intermediate nodes.

Another aspect of the invention is the provision of additional routers which serve as nodes. The selection of intermediate routers is based on criteria such as congestion state and/or capacity and/or monitoring needs. For example, noting FIG. 4, the user IP packets are sent from the UE through radio tower T to the nearest router NR, typically referred to as an access router, by way of the radio tower T and then to an intermediate node router such as IN1 and finally to the gateway router GR, serving as the gateway to the internet. The reason for routing the IP packets via IN1 may be that IN1 is not congested with excessive traffic, compared to other routers that could have been used to send IP packets from NR to GR. Alternately, the reason for routing the IP packets via IN1 may be that traffic monitoring equipment is connected to IN1, and a legal requirement that all IP packets emanating from one or more UEs are to be monitored. The IPv6 header of the User IP packets contain the IP addresses of the intermediate router IN1 and the Gateway Router GR in the Routing Header, eliminating the need for tunneling and encapsulation. There are several ways in which the IPv6 routing headers are populated with the appropriate IP addresses of the Gateway Router as well as additional Intermediate Routers.

As one example, the UE constructs the IPv6 packets with this routing header information. This method requires that the UE is made aware of the necessary information regarding the IPv6 addresses of the GR and the Intermediate Nodes. For example, the Network may inform the UE prior to data transmission.

Another technique is to allow the NR to perform this task. In this scenario, the UE need not be aware of the IP routing within the cellular network at all. In fact, the UE may even be an IPv4 device. The Nearest Access Router will be equipped to perform address translation (from IPv4 to IPv6) if necessary and to add the appropriate IPv6 Routing Header. The advantage of this technique is that the NR, being part of the fixed network of the cellular system, can be made aware of the network status (in terms of congestion, failures etc), as well as the need for processing by special intermediate nodes for purposes such as legal interception.

As another alternative embodiment, the GR may add and/or modify routing headers of received packets and convey the packets to a UE through an access router, access router being a standard term typically designated as the first router communicating with a UE through a radio tower.

What is claimed is:

1. A method implemented in a router in an Internet Protocol (IP)-based network, the method comprising:
   the router receiving an IP packet from a user equipment in an IP version 4 (IPv4) format, the packet including a destination IP address;
   the router selecting an intermediate node for routing the packet based on network status information;
   the router converting the packet to an IP version 6 (IPv6) format;
   the router inserting an IPv6 routing header into the packet, the routing header including an IP address of the intermediate node; and
   the router sending the packet to the destination IP address via a path specified in the routing header.

2. The method of claim 1, wherein the network status information relates to network congestion.

3. The method of claim 1, wherein the intermediate node is selected to enable lawful interception.

4. The method of claim 1, wherein the intermediate node is selected based on whether the intermediate node is configured to monitor traffic.

5. The method of claim 1, wherein the routing header further includes an IP address of a gateway router.

6. The method of claim 1, wherein the destination IP address is an IP address of a user equipment.

7. A method of communicating data in an Internet Protocol (IP)-based network, the method comprising:
   receiving a packet in an IP version 4 (IPv4) format, the packet including a destination IP address;
   selecting an intermediate node for routing the packet based on network status information;
   converting the packet to an IP version 6 (IPv6) format;
   inserting an IPv6 routing header into the packet, wherein the IPv6 routing header indicates a routing path for routing the packet to the destination IP address, and wherein the routing path includes the intermediate node; and
   transmitting the packet.

8. The method of claim 7, wherein the network status information relates to network congestion.

9. The method of claim 7, wherein the intermediate node is selected to enable lawful interception.

10. The method of claim 7, wherein the intermediate node is selected based on whether the intermediate node is configured to monitor traffic.

11. The method of claim 7, wherein the routing header further includes an IP address of a gateway router.

12. The method of claim 7, wherein the destination IP address is an IP address of a user equipment.

13. A method of communicating data in an Internet Protocol (IP)-based network, the method comprising:
   receiving an IP version 4 (IPv4) packet, the IPv4 packet including a destination IP address;
   selecting an intermediate node for routing data to the destination IP address based on network status information;
   generating an IP version 6 (IPv6) packet based on the IPv4 packet, wherein the IPv6 packet includes an IPv6 routing header that indicates a routing path for routing the IPv6 packet to the destination IP address, and wherein the routing path includes the intermediate node; and
   transmitting the IPv6 packet.

14. The method of claim 13, wherein the network status information relates to network congestion.

15. The method of claim 13, wherein the intermediate node is selected to enable lawful interception.

16. The method of claim 13, wherein the intermediate node is selected based on whether the intermediate node is configured to monitor traffic.

17. The method of claim 13, wherein the routing header further includes an IP address of a gateway router.

18. The method of claim 13, wherein the destination IP address is an IP address of a user equipment.

* * * * *